(Model.)
E. M. KISSELL.
FERTILIZER ATTACHMENT FOR SEEDING MACHINES.
No. 264,461. Patented Sept. 19, 1882.
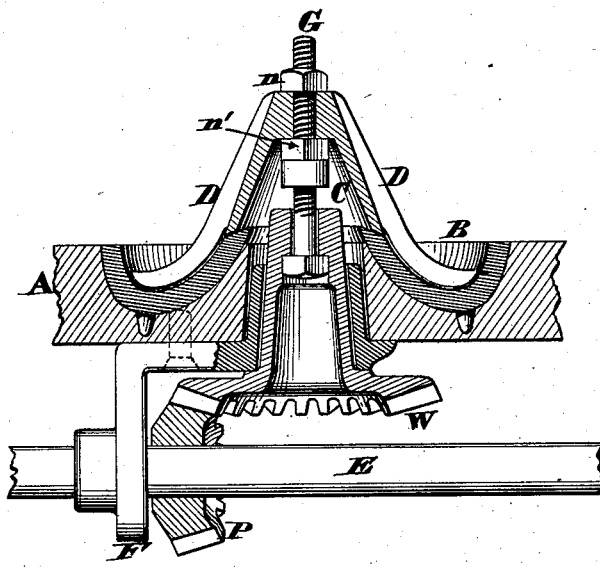
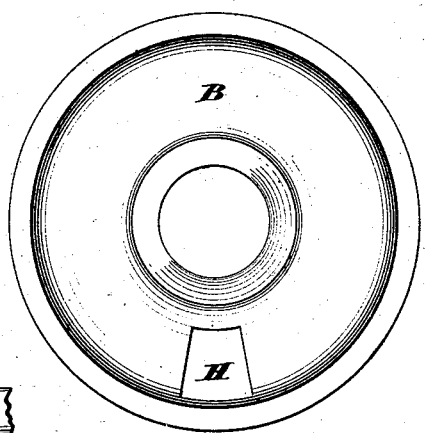
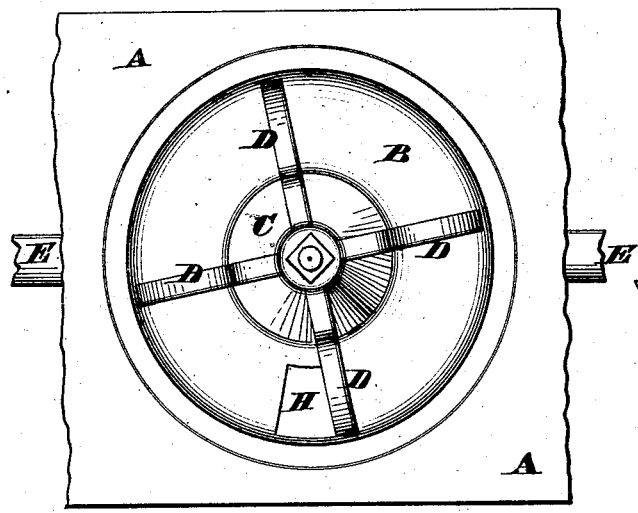
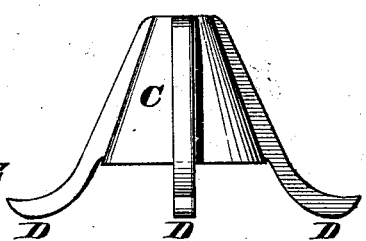
Attest:
John C. Schwartz
Gus. A. Meyers
Inventor.
Emanuel M. Kissell.
by Stem & Peck
his Attys.

UNITED STATES PATENT OFFICE.

EMANUEL M. KISSELL, OF SPRINGFIELD, OHIO.

FERTILIZER ATTACHMENT FOR SEEDING-MACHINES.

SPECIFICATION forming part of Letters Patent No. 264,461, dated September 19, 1882.

Application filed January 3, 1882. (Model.)

*To all whom it may concern:*

Be it known that I, EMANUEL M. KISSELL, a citizen of the United States, residing at Springfield, Clarke county, Ohio, have invented certain new and useful Improvements in Fertilizer Attachments for Seeding-Machines, of which the following is a specification.

My invention consists in an improvement designed for the even distribution of the fertilizing material and for preventing its sticking or caking in the bottom of the hopper, which has been the source of great trouble, expense, and annoyance. Various devices have been used for both these purposes; but as the hopper bottom or cups were usually made of iron or other metal either moisture or the acids contained in the fertilizing material would rust the metal or eat into and roughen the surface, and at the same time make the fertilizer more or less sticky, causing it to adhere to the metal or form into lumps or cakes, thus partially destroying the usefulness of the fertilizer and preventing its even distribution. To overcome these difficulties, I construct the cups or the bottom of the hopper of glass, and, if desirable, the stirrers may be made of glass, also. The surface of this glass cup or bottom cannot be affected by the acids in the fertilizer; nor will it rust from moisture or become roughened. The fertilizer is in a mealy state, and, by the stirrers, is evenly distributed, as required, and prevented from sticking or caking.

To more fully illustrate my invention, I will refer to the accompanying drawings, making part of this specification.

Figure 1 is a vertical section of my hopper-bottom, cup-stirrers, and working mechanism, taken through the line of the shaft. Fig. 2 is a top view of the same. Fig. 3 is a plan view of the glass cup. Fig. 4 is a vertical view of the working-cone carrying the stirrers.

A is the bottom of the hopper, and B is a shallow circular basin or cup, made of glass, and let into the bottom A.

C is a rotating cone surrounding the perpendicular shaft G and carrying the arms D D, which revolve in the bottom of the hopper B and stir and distribute the fertilizing material. This cone can be made stationary and the arms D D attached directly to the shaft G; but I prefer the form shown.

The perpendicular shaft G is provided at its lower end with a beveled-gear wheel, W, which works in the beveled pinion P, attached to the driving-shaft E.

F forms a shaft-bearing for the driving-shaft E, attached beneath the bottom of the hopper.

The driving-shaft E is operated from the wheels of the seeding-machine by any suitable gearing, and, by the beveled-gear wheels P and W, revolves the shaft G. The stirring-arms D D and cone C are attached to this perpendicular shaft G by the nuts $n$ $n'$ and revolve with it.

H is the opening in the bottom of the hopper, through which the fertilizer passes into the tube and thence to the ground.

Operation: The hopper being filled with fertilizer and the seeding-machine set in motion, the shaft E revolves, and, by the beveled-gear wheels P and W, rotates the perpendicular shaft G, to which the stirrers D D and cone C are attached, and which rotate with it. The arms D D stir the fertilizing material and feed it through the opening H, so that it is constantly and evenly distributed, and the cup B, being of glass, is perfectly smooth and prevents the fertilizer sticking or clogging or caking, either from the effect of moisture or acids, and, if desirable, the cone C and arms D D can be also made of glass.

I am aware that glass has been before proposed in the construction of seeding-machines, and therefore do not broadly claim its application to this class of machines; but, Having described my invention, I claim—

1. In the feed mechanism of a fertilizer-drill, horizontally-set cups, made of glass, in combination with superimposed rotating stirrers, substantially as described.

2. In the feed mechanism of a fertilizer-drill having glass cups or bottoms, the combination, with said glass cups or bottoms, of glass stirrers arranged to rotate in a hopper above the cups, substantially as and for the purpose described.

3. In the feed mechanism of a fertilizer-drill, the combination, with horizontally-set glass cups, of a central revolving cone provided with stirrers projecting therefrom, substantially as and for the purpose specified.

EMANUEL M. KISSELL.

Witnesses:
CHARLES RABBITTS,
THOMAS I. PRINGLE.